April 11, 1967     R. E. TOUZALIN ET AL     3,313,528

METHOD OF MIXING MOLTEN METAL

Filed Nov. 6, 1964

INVENTORS
ROBERT E. TOUZALIN
BY RUDOLPH R. PATRICK

Teare, Fetzer & Teare

ATTORNEYS

April 11, 1967 R. E. TOUZALIN ET AL 3,313,528
METHOD OF MIXING MOLTEN METAL
Filed Nov. 6, 1964 5 Sheets-Sheet 2

INVENTORS
ROBERT E. TOUZALIN
RUDOLPH R. PATRICK
BY Teare, Fetzer & Teare
ATTORNEYS

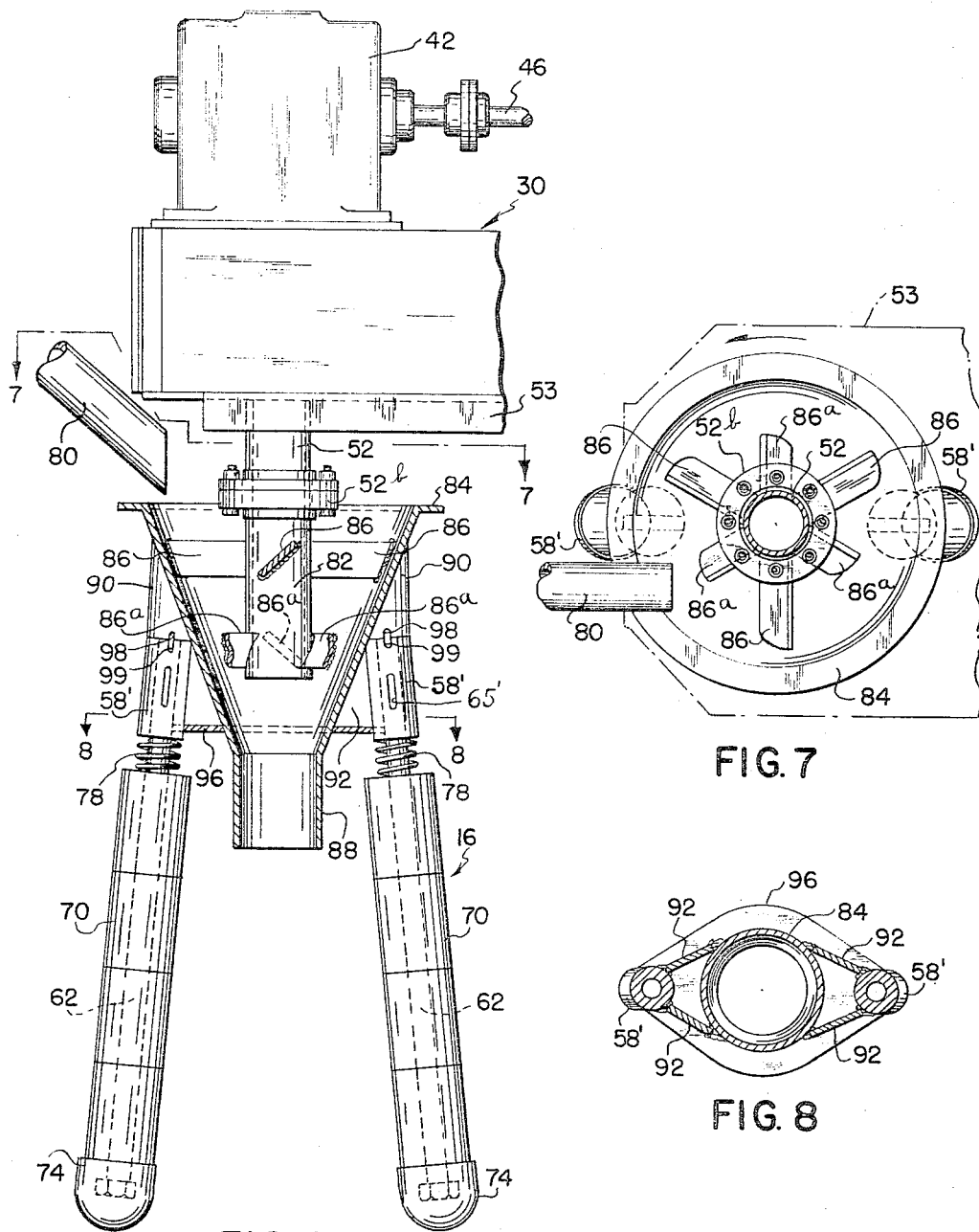

INVENTORS
ROBERT E. TOUZALIN
RUDOLPH R. PATRICK
BY Teare, Fetzer & Teare
ATTORNEYS April 11, 1967  R. E. TOUZALIN ET AL  3,313,528
METHOD OF MIXING MOLTEN METAL
Filed Nov. 6, 1964  5 Sheets-Sheet 5

INVENTORS
ROBERT E. TOUZALIN
BY RUDOLPH R. PATRICK
Teare, Fetzer & Teare
ATTORNEYS

United States Patent Office 3,313,528
Patented Apr. 11, 1967

3,313,528
METHOD OF MIXING MOLTEN METAL
Robert E. Touzalin, Aurora, and Rudolph R. Patrick, Broadview Heights, Ohio, assignors to Interlake Steel Corporation, a corporation of New York
Filed Nov. 6, 1964, Ser. No. 409,393
14 Claims. (Cl. 259—51)

This invention relates in general to mixing apparatus, and more particularly to a mixing apparatus for use in connection with relatively large batches of liquid-like materials.

In industry today it is often times necessary to mix relatively large batches of liquid-like material, such as chemicals or molten metals. Many times it is necessary to introduce additive ingredients into a batch of the liquid-like material, for the purpose of providing a particular analysis for the material. This addition of ingredients should be carried out in a manner so that the ingredients will be mixed uniformly throughout the mass of material, and this thorough mixing of a relatively large mass of material, often at a relatively high temperature, is extremely difficult to accomplish.

The present invention provides a novel mixing apparatus for mixing a relatively large batch of liquid-like material, and an apparatus which will expeditiously mix the batch, so that any analysis of the same will be substantially uniform throughout the entire batch.

Accordingly, an object of the present invention is to provide a novel apparatus for mixing relatively large batches of liquid-like material.

Another object of the invention is to provide a novel apparatus which will expeditiously mix a relatively large batch of material, and which will expedite the mixing of additives to the batch.

Another object of the invention is to provide a novel mixing apparatus for relatively large batches or masses of liquid-like material, and one that is horizontally swingable and vertically movable in and out of working position relative to the batch of material, and which apparatus has novel impeller mechanism which causes intense agitation and thorough mixing of the liquid-like mass of material.

A still further object of the invention is to provide a novel mixing apparatus of the above type wherein the impeller is of a construction which causes a strong vortex at the center of rotation of the impeller, which acts to draw additives provided, down into the molten mass.

Other objects and advantages of the invention will be apparent from the following description taken in conjunction with the accompanying drawings wherein:

FIG. 6 is an enlarged, partially sectioned, elevational view of the impeller mechanism illustrating a modified embodiment thereof, and more particularly one having a feed hopper associated therewith;

FIG. 7 is a sectional plan view taken generally along the plane of line 7—7 of FIG. 6, looking in the direction of the arrows;

FIG. 8 is a sectional view taken generally along the plane of line 8—8 of FIG. 6, looking in the direction of the arrows;

Figure 1:
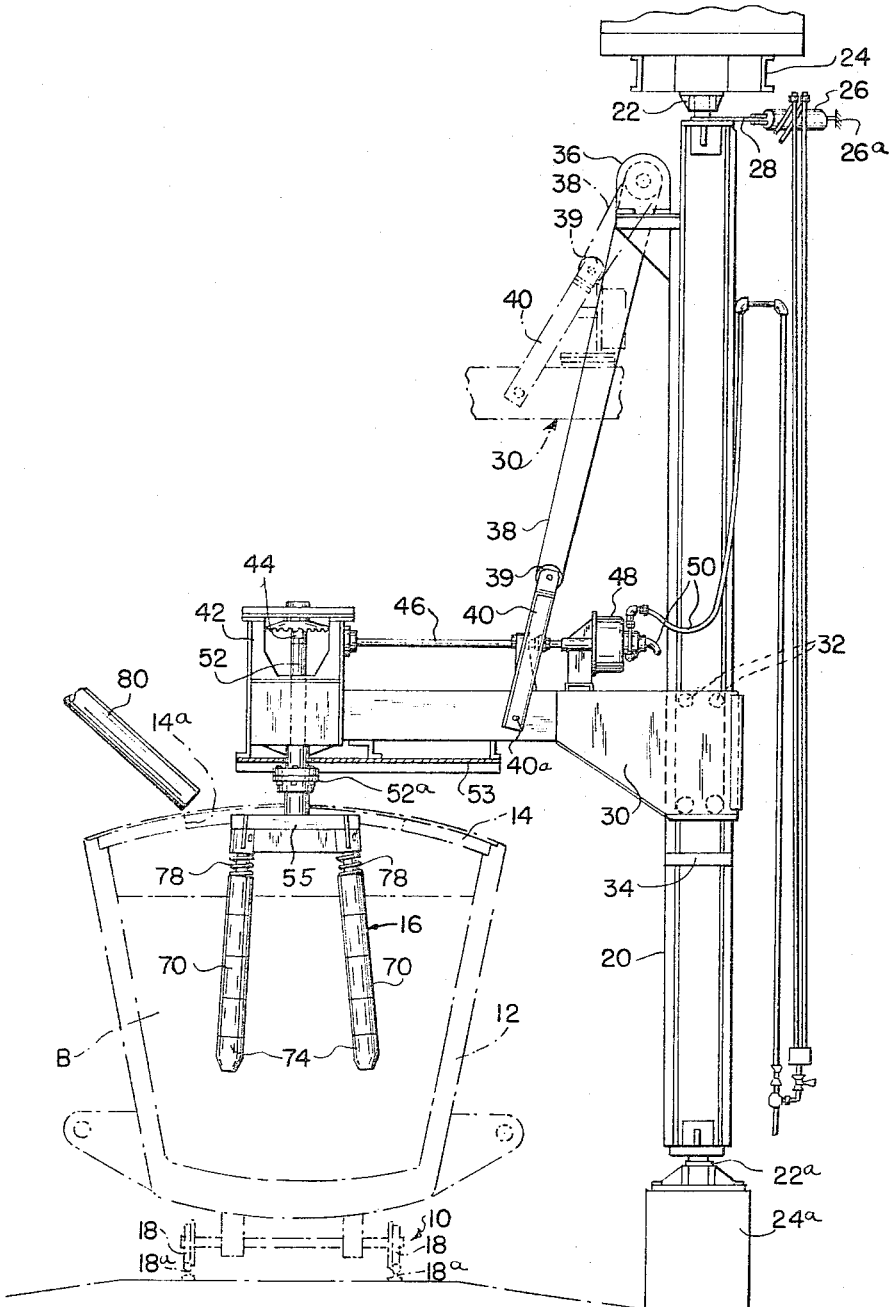
FIG. 1 is a side elevational, partially sectioned view of the mixing apparatus in a working position, in fragmentary phantom lines is shown a raised or non-working position of the carriage of the mixer mechanism.

Referring now again to the drawings there is shown a ladle car 10 including a refractory ladle 12 with preferably a removable cover 14 thereon, which may have an opening 14a therein, through which the impeller mechanism 16 may be lowered, for stirring of a liquid-like mass of material, such as for instance a batch of molten iron. The ladle car may be mounted on wheels 18 for rolling movement along the tracks 18a, and in the conventional manner.

A vertical bearing column 20 may be provided, with column 20 being preferably mounted for rotation about a generally vertical axis by means of upper and lower bearing structures 22, 22a. Bearing structure 22 may be supported by an overhead support 24, and bearing structure 22a may be supported on footing 24a.

Rotation of the column 20 about its vertical axis may be accomplished by means of a double-acting, fluid powered motor unit 26, rotatably supported from an upper support 26a, and pivotally coupled to an arm 28 which in turn may be coupled to the column. Thus upon actuation of the motor unit 26, column 20 will be rotated in its bearings 22, 22a. The arrangement is preferably such that the column 20 may be rotated at least 90°, so that the mixer mechanism can be moved into and out of alignment with the ladle 12, when the mixer is raised from its position within the ladle.

A generally laterally extending carriage 30 is mounted on the column 20 preferably for vertical movement with respect thereto, and as for instance by means of wheel members 32 mounted on the carriage and coacting with flanges or tracks on the column 20. Downward movement of the carriage 30 with respect to the column 20 may be limited by means of stops 34 on column 20.

Vertical movement of the carriage 30 carrying the impeller mechanism may be accomplished by providing a powered hoist 36, mounted on column 20 adjacent its upper end, with the hoist 36 being operatively connected to the carriage 30 by means of preferably metal or wire cables 38, coacting with the rotatable pulley 39, mounted on arm 40 which may be pivoted as at 40a to the carriage 30. Thus upon actuation of hoist 36 and reeving of the cable 38, the carriage 30 may be moved to an upper position, as shown in phantom lines in FIG. 1.

A gear housing 42 may be mounted adjacent the distal end of carriage 30, and such housing may enclose a geared speed reduction unit 44, driven by means of shaft 46 operably coupled to a fluid powered motor unit 48 mounted on the carriage 30. Motor unit 48 may be coupled by flexible hose 50, preferably of metal, to a source of actuating fluid. Reduction unit 44 drives a vertical shaft 52 which in turn is coupled by means of a preferably split coupling 52a to the impeller mechanism 16. A plate-like heat shield 53 (FIG. 1) may be provided to aid in protecting the reduction unit and carriage.

Figure 2:
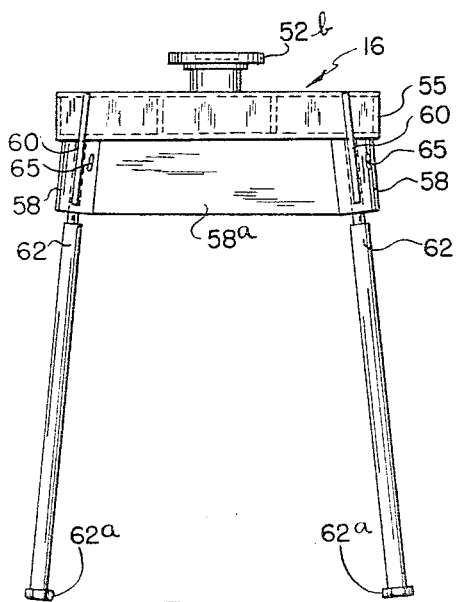
FIG. 2 is an enlarged, elevational view of the impeller frame and rod construction, with the refractory sleeves of the impeller removed.
Figure 3:
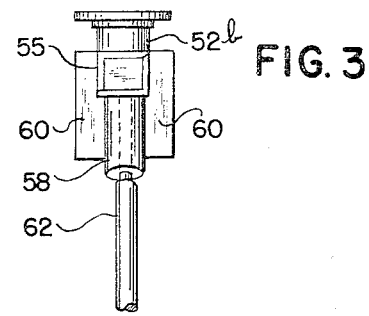
FIG. 3 is an enlarged, fragmentary elevational view taken from the right hand side of FIG. 2, and showing the connection of the socket and associated impeller rod to the impeller frame.

Impeller mechanism 16 may comprise a frame including a body portion 55 (FIGS. 1 and 2) which may be of the fabricated, generally elongated box-like construction illustrated in FIGS. 2 and 3, with the split coupling section 52b extending upwardly therefrom, for connection to the drive shaft 52 of the reduction unit 44. Depending from body portion 55 adjacent opposite ends thereof and secured thereto as by welds may be a pair of socket members 58, which in turn may be connected by a longitudinal web 58a. Sockets 58 are disposed obliquely with respect to body portion 55 as best shown in FIG. 2, and may also have strengthening webs 60 coacting between the sockets and the body portion for strengthening the attachment of the sockets to the body portion.

Figure 4:
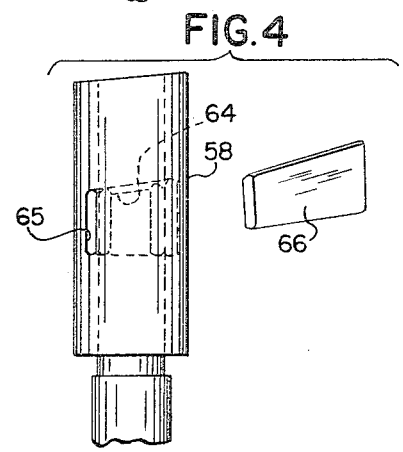
FIG. 4 is an enlarged, fragmentary exploded view of the upper end of the socket connection of one of the impeller rods, and showing the arrangement for connecting the rod to the socket.

Each of sockets 58 mounts an elongated impeller arm or rod 62, with the rod, in the embodiment illustrated, having a head 62a at its distal end. The rod 62 also has a tapered slot 64 therethrough (FIG. 4) adjacent its upper end which is adapted for general alignment with a complementary slot 65 through the walls of the respective socket member 58, for receiving therein a tapered pin 66 (FIG. 4) for detachably connecting the rod to its respective socket.

Figure 5:
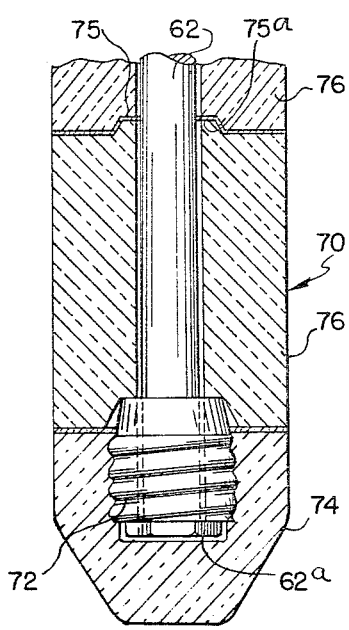
FIG. 5 is an enlarged, fragmentary, vertical sectional view of the bottom end of the impeller rod and the refractory sleeve members mounted thereon.

Each of the rods or arms is adapted to receive thereon in supporting relation a covering or sleeve 70 of heat resistant material. The sleeves 70 may be formed of graphited-refractory material and are preferably of the sectional, cylindrical configuration illustrated. A preferably refractory nut 72 can be slipped over the upper end of the rod and then threaded into the refractory tip segment 74 of the sleeve, and then the other sleeve sections 76 may be slipped over the end of the rod into the superimposed condition illustrated in FIG. 5. The sleeve sections preferably have complementary embossments and recesses 75, 75a thereon for aiding in aligning the sleeve segments and aiding in maintaining their assembled relation on the respective rod. The refractory sleeve sections 76 preferably have a refractory cement placed between their joints for sealing the latter, and may be held on the rod by spring members 78 (FIG. 1) coacting between the adjacent sleeve section and the underside of the associated socket 58. Asbestos rope is preferably wound about springs 78 after assembly to aid in protecting the springs.

It will be seen that the wedge 66 can be readily removed from the associated slots in the rod 62 and socket 58, thereby permitting removal of the rod from its socket and ready replacement of the refractory sleeves.

When the motor unit 48 is actuated to cause rotation of the drive shaft 52 and thus rotation of the associated impeller mechanism 16, a highly effective mixing action of the liquid-like batch of material in the ladle 12 occurs, with an intense agitation of the batch of material and the forming of a strong vortex at the center of the batch. This agitation and strong vortex draws additives which are added to the ladle as by means of chute 80, down into the molten batch, thus causing a higher recovery of the additives furnished thereto and a more uniform analyses of the batch of material. It will be noted that the impeller rods and associated sleeves are of a quite long dimension, and preferably extend a substantial distance into the batch B of material. The refractory sleeves on the impeller mechanism have the ability to withstand high temperatures so that the impeller can be used for numerous mixing cycles. Also such refractory sleeves are low in cost and with the arrangement illustrated are readily replaceable on the associated rod 62 if and when replacement becomes necessary.

Referring now to FIG. 6 there is shown a modified form of the invention wherein a feed hopper is integrally associated with the mixing apparatus for expeditiously adding additives to the batch of material, and to the center of the vortex formed by the rotary impeller mechanism. In this arrangement, the split coupling section 52b has a tubular-like, in the embodiment illustrated, depending support member 82, which supports thereon an inverted conical-like hopper 84. Webs or blades 86, 86a extend generally radially between the tube 82 and the inner surface of the hopper 84, for supporting the hopper on the tube 82. Webs 86, 86a are preferably disposed obliquely with respect to the vertical, and as best shown in FIG. 7, with webs 86a being offset with respect to the webs 86 when viewed in plan. The oblique relationship of webs 86, 86a provides for optimum mixing by the blades, which engage the material being added by means of a chute or tube 80, and cause it to be more uniformly mixed and distributed as it is flowing into the ladle 12. Hopper 84 preferably has generally cylindrical lower section 88 for directing a generally downwardly directed stream of the additive materials into the vortex formed by the rotating impeller mechanism.

Oblique sockets 58' which support the rods 62 therein, are of a generally similar construction as the sockets 58 of the first described embodiment, and with such sockets 58' being connected to the outer surface of the hopper 84 by means of upper webs 90 and lower lateral webs 92. Cross web 96 may also be provided for further strengthening the attachment of the sockets to the hopper 84.

Figure 9:
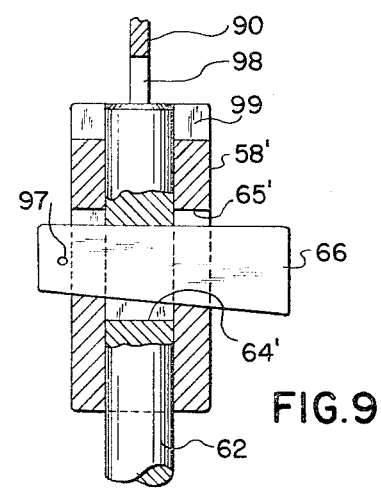
FIG. 9 is an enlarged, sectional view showing the connection of the impeller rod and its associated socket to the impeller frame of the FIG. 6 arrangement.

Referring now to FIG. 9, it will be seen that the slot 64' through the associated rod 62 is adapted to be generally aligned with the slot 65' in socket 58'. However, the arrangement is preferably such that the key 66 coacts with the upper edge of the slot 64' in the rod 62, and with the lower edge of the slot 65' in the socket 58'. A cotter pin 97 may be provided through the wedge 66 to positively hold it in assembled relationship. There is also preferably provided a slot 98 in the associated web 90 which registers with a complementary slot 99 in the upper end of the respective socket 58' for aiding in removal of the rod from its associated socket for replacement of the refractory sleeves.

It will be seen that upon rotation of the drive shaft 52 as driven by shaft 46 of the motor unit. The support member 82 will rotate, thus causing rotation of the hopper 84 and associated impeller mechanism and that the additive material being added by means of chute 80 will be mixed and rotated in the hopper 84, due to its rotation and the striking of the material by the rotating mixer blades 86, 86a. The additive material will then be directed downwardly through cylindrical section 88 to the center of the vortex formed by the rotating impeller 16, resulting in highly effective mixing and additive adding operation. Hopper 84 may rotate, for instance, at a speed of approximately 100 r.p.m. and may be varied in its speed of rotation by the provision of conventional variable speed controls in the system controlling the actuation of motor 48.

Figure 10:
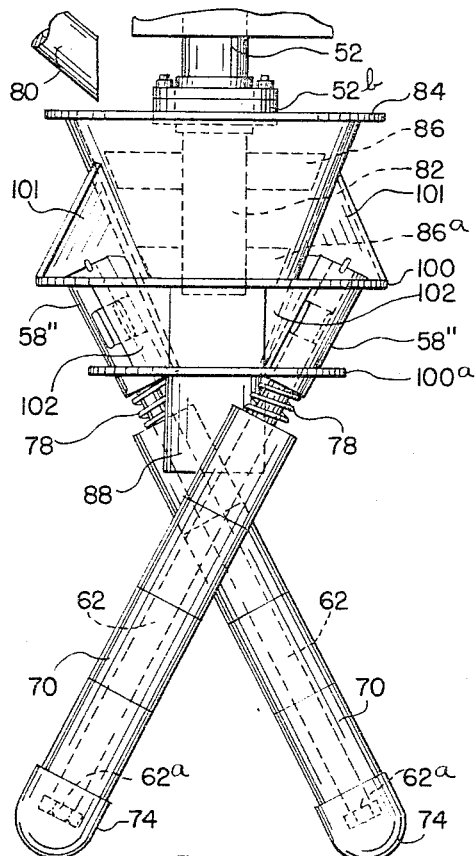
FIG. 10 is an enlarged, elevational view of another embodiment of impeller unit having a feed hopper mechanism associated therewith.
Figure 11:
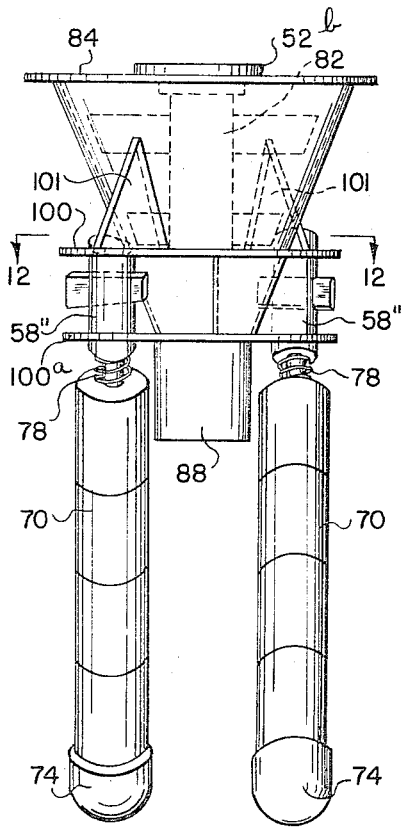
FIG. 11 is an elevational view taken from the right hand side of FIG. 10.
Figure 12:
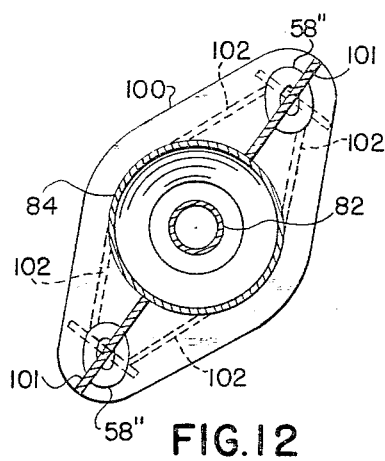
FIG. 12 is a sectional view taken generally along the plane of line 12—12 of FIG. 11 looking in the direction of the arrows.

Referring now to FIGS. 10, 11 and 12, there is shown a further modification of the invention wherein the impeller rods or arms are crossed with respect to one another instead of extending diagonally outwardly when viewed in side elevation, and as shown for instance in FIG. 10. The sockets 58" of this arrangement may be of the same general construction as those of the FIG. 6 embodiment, and are secured to upper and lower generally horizontal retainer plates 100, 100a, which in turn are attached as by welds to the exterior surface of the hopper 84. As can be seen from FIGS. 10 and 11, such socket members are directed downwardly and inwardly with respect to one another, and with respect to the hopper 84, so that when the rods and associated sleeves are attached thereto, the latter cross one another, with the cylindrical section 88 of the rotatable hopper extending between such impeller arms. Webs 101 extending between and secured to the top retainer plate 100 and the exterior wall of the hopper strengthen the attachment of the socket members 58″ to the hopper, while retainer webs 102 extending between and secured to the socket members 58″ and to the exterior of the hopper, and disposed intermediate the retainer plates 100, 100a, further strengthen the attachment of the sockets to the hopper. It has been found that such crossed elongated impeller arms causes highly intense agitation of a mass of liquid-like material, such as molten metal, with an extremely strong vortex at the center thereof which draws additives flowing from a chute 80 down into the vortex, and then mixes it uniformly throughout the batch in the ladle 12.

Figure 13:
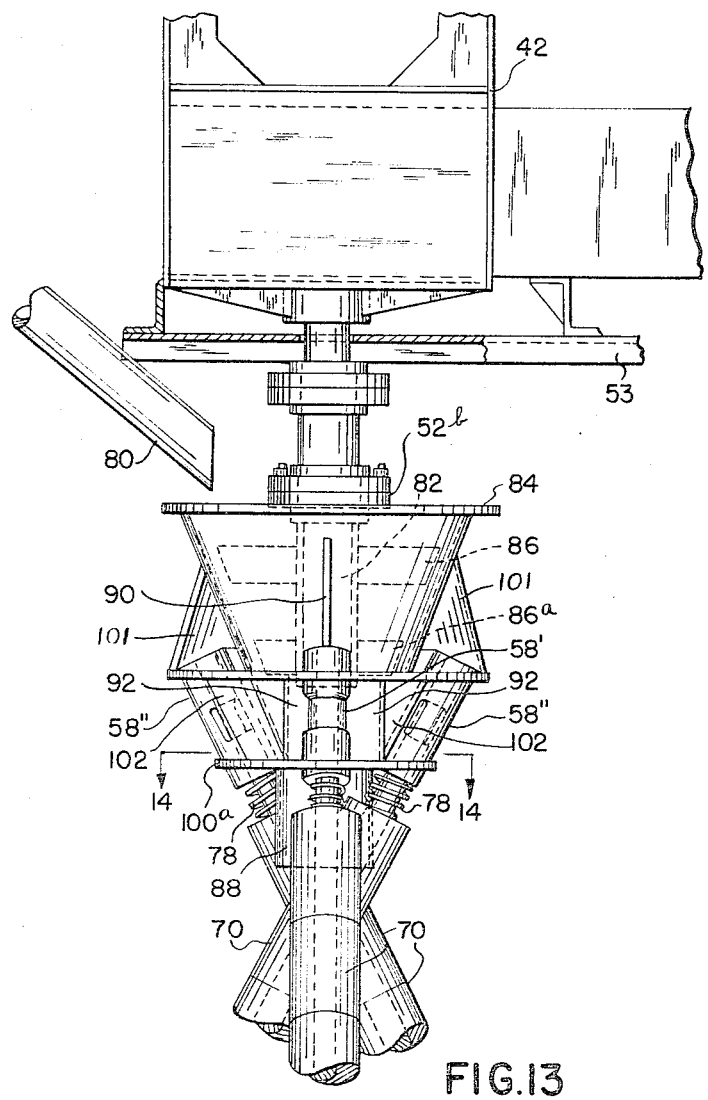
FIG. 13 is a fragmentary, elevational view of another embodiment of impeller mechanism, and one which generally combines the features of FIG. 6 with those of FIGS. 10 and 11.
Figure 14:
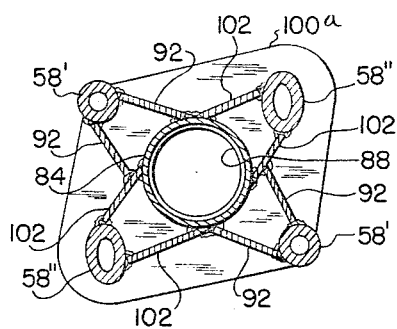
FIG. 14 is a sectional view taken generally along the plane of line 14—14 of FIG. 13.

Referring now to FIGS. 13 and 14 there is shown a further embodiment of the invention wherein the generally inverted U-shaped arrangement of impeller arms as shown for instance in FIGS. 6 to 8 is combined with the crossed arrangement of impeller arms, as shown for instance in FIGS. 10 to 12, to provide a mixer arrangement comprising four impeller arms effectively and symmetrically attached to the rotatable hopper 84, and which effectively provides for mixing of additives to the liquid-like mass of material in a ladle. It will be seen that with such an arrangement there is no interference between any of the parts of the impeller arms, and the liquid-like material is effectively mixed with an extremely strong vortex caused in the center of the batch during the mixing operation.

From the foregoing discussion and accompanying drawings it will be seen that the invention provides a novel mixing apparatus for mixing large batches of liquid-like material, such as for instance molten metals, chemicals, etc., and in a manner that the ingredients will be mixed uniformly throughout the mass of material, and which will operate effectively at relatively high temperatures. The invention also provides a novel mixing apparatus embodying feed hopper mechanism associated therewith for more uniformly distributing additives to the molten mass throughout the molten mass. The invention also provides a novel method for mixing a large batch of material and adding additives thereto.

The terms and expressions which have been used are used as terms of description, and not of limitation, and there is no intention in the use of such terms and expressions of excluding any equivalents of any of the features shown or described, or portions thereof, and it is recognized that various modifications are possible within the scope of the invention claimed.

We claim:

1. In an apparatus for mixing a large batch of liquid-like material comprising, a support, mixer means mounted on the support, means for moving said mixer means generally vertically from a lowered operative position to a ranged inoperative position and vice versa, said mixer means comprising at least one pair of depending elongated impeller members disposed in laterally spaced relation, means for rotating said impeller members about a generally vertical axis extending between said impeller members, and with respect to said support, said impeller members being formed of a heat resistant material, and each of said impeller members being comprised of a central rod-like member and a heat resistant casing encompassing said rod-like member, said casing being removably connected to the associated rod-like member, and resilient means coacting with said casing to hold the latter in assembled relation with said rod-like member.

2. An apparatus in accordance with claim 1 wherein said impeller members diverge outwardly with respect to one another in a downward direction, and means detachably connecting said impeller members to said mixer means.

3. An apparatus in accordance with claim 1 wherein said casing is comprised of a plurality of refractory sleeve-like sections disposed in end-to-end relation, and means on said sections coacting to align the latter and maintain said aligned relation.

4. An apparatus in accordance with claim 1 including hopper means on said mixer means for feeding material into a batch of the liquid-like material.

5. An apparatus in accordance with claim 4 including means operatively connecting said hopper means to said impeller members for rotation of said hopper means with rotation of said impeller members.

6. An apparatus in accordance with claim 5 wherein said hopper means includes deflecting means thereon for aiding in mixing of material fed into said hopper means.

7. An apparatus in accordance with claim 6 wherein said deflecting means comprises a plurality of spaced blade-like members extending generally transversely of said hopper means, said blade-like members being disposed obliquely with respect to vertical planes passing through said blade-like members.

8. An apparatus in accordance with claim 1 wherein said impeller members are oriented so as to cross one another when viewed in side elevation.

9. In an apparatus for mixing a large batch of liquid-like material comprising, a support, mixer means mounted on the support, means for moving said mixer means generally vertically from a lowered operative position to a raised inoperative position and vice versa, said mixer means comprising a generally vertically extending rotatable drive member, means for rotating said drive member about a generally vertical axis, a feed hopper member operatively coupled to said drive member for feeding material into the batch, and at least one pair of elongated impeller members disposed in laterally spaced relation and operatively coupled to said hopper member for rotation therewith upon rotation of said drive member, said impeller members being formed of heat-resistant material and being disposed on opposite sides of said hopper member, said impeller members extending below said hopper member, said hopper member being of generally inverted conical configuration and having an exit opening in the bottom thereof, said exit opening being disposed intermediate said impeller members, and deflecting means in said hopper member for aiding in mixing of material fed into said hopper member prior to its passage through said exit opening.

10. An apparatus in accordance with claim 9 wherein said support comprises a generally vertical column, a carriage mounted on said column for vertical movement with respect thereto and extending laterally of said column, said mixer means being disposed on said carriage, and means for rotating said column about a generally vertical axis to cause swinging of said carriage in a generally horizontal plane.

11. In an apparatus for mixing large batches of liquid-like material comprising a support, mixer means mounted on the support, means for moving said mixer means generally vertically from a lowered operative position to a raised inoperative position and vice versa, said mixer means comprising pairs of generally depending elongated impeller members disposed in generally side-by-side relation, said impeller members being formed of heat resistant material and being generally symmetrically arranged about a generally vertical axis extending between said impeller members, said impeller members of one of said pairs diverging outwardly with respect to one another in a downward direction and providing a generally inverted U-shaped configuration, the impeller members of the other of said pairs crossing one another when viewed in side elevation and providing a generally X-shaped configuration in side elevation, feed hopper means mounted on the support for rotation with said impeller members, said feed hopper means having an exit opening in the bottom thereof with said exit opening disposed intermediate said impeller members, and each of said impeller members comprising a central rod-like member and a refractory sectional casing encompassing said rod-like member, said casing being removably connected to the associated rod-like member, resilient means coacting with said casting to hold the latter in assembled relation with said rod-like member, and means detachably connecting each of the impeller members to the mixer means.

12. An apparatus in accordance with claim 11 wherein said mixer means includes a geared reduction unit mounted on said support, and motor means mounted on said support and operatively coupled to said gear reduction unit for rotating said hopper and associated impeller members about said generally vertical axis.

13. In an apparatus for mixing a large batch of liquid-like material comprising, a support, mixer means mounted on said support, said mixer means comprising a generally vertically extending rotatable drive member, motor means for rotating said drive member, a feed hopper member operably coupled to said drive member for feeding additive material into said batch, and two pairs of elongated impeller members disposed in laterally spaced relation and operatively coupled to said hopper member for rotation therewith upon rotation of said drive member, said impeller members including a heat resistant casing and being disposed on opposite sides of said hopper member and extending below said hopper member, the impeller members of one of said pairs diverging outwardly with respect to one another in a downward direction and providing a generally inverted U-shaped configuration, and the impeller members of the other pair crossing over one another when viewed in side elevation and providing a generally X-shaped configuration in side elevation, whereby a vortex is formed in the batch upon rotation of said drive member.

14. In an apparatus in accordance with claim 13, wherein said hopper member is of a generally inverted conical configuration and has an exit opening in the bottom thereof, said exit opening being disposed intermediate said impeller members, and deflecting means disposed in said hopper member for aiding in mixing of the additive material fed into said hopper member prior to its passage through said exit opening.

References Cited by the Examiner

UNITED STATES PATENTS

| | | | |
|---|---|---|---|
| 1,391,013 | 9/1921 | Schwager | 259—23 |
| 3,201,093 | 9/1965 | Smith | 259—4 |
| 3,212,757 | 10/1965 | Martin et al. | 259—4 |

FOREIGN PATENTS 265,073   2/1927   Great Britain.

WALTER A. SCHEEL, *Primary Examiner.*

R. W. JENKINS, *Assistant Examiner.*